DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 14, 1970

873 O.G. 339

T873,008

METHOD OF INSPECTING THE INTERIOR OF SMALL HOLES

Frederic T. Taraschi, Haddon Heights, N.J., assignor to E. I. du Pont de Nemours and Company, Wilmington, Del., a corporation of Delaware

Continuation of application Ser. No. 636,459, May 5, 1967. This application Oct. 14, 1969, Ser. No. 866,443

**Int. Cl. F21l *1/00***

U.S. Cl. 240—2.18

1 Sheet Drawing. 7 Pages Specification

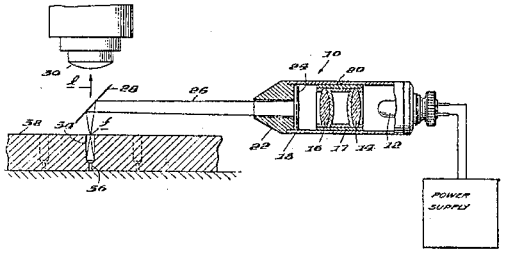

For inspecting the interior of small deep bores such as bores in spinnerets employed for melt spinning of synthetic filaments the interior of the hole is illuminated by passing a light beam from a high intensity zirconium arc lamp (12) through an achromatic condensing lens (14) and an achromatic focusing lens (16). The lens system collects a large angle of the light emitted from the zirconium arc and condenses it such that a narrow high intensity beam of converging light emerges from the passage through nose piece (22). Iris diaphragm (24) is useful in reducing the diameter of the beam. A half silvered mirror (28) directs the light beam into the hole the focal point of the light beam being at or near the entrance to the hole and on the centerline of the hole. A microscope (30) is positioned with its optical axis in line with the center of the hole for inspecting the interior of the hole.

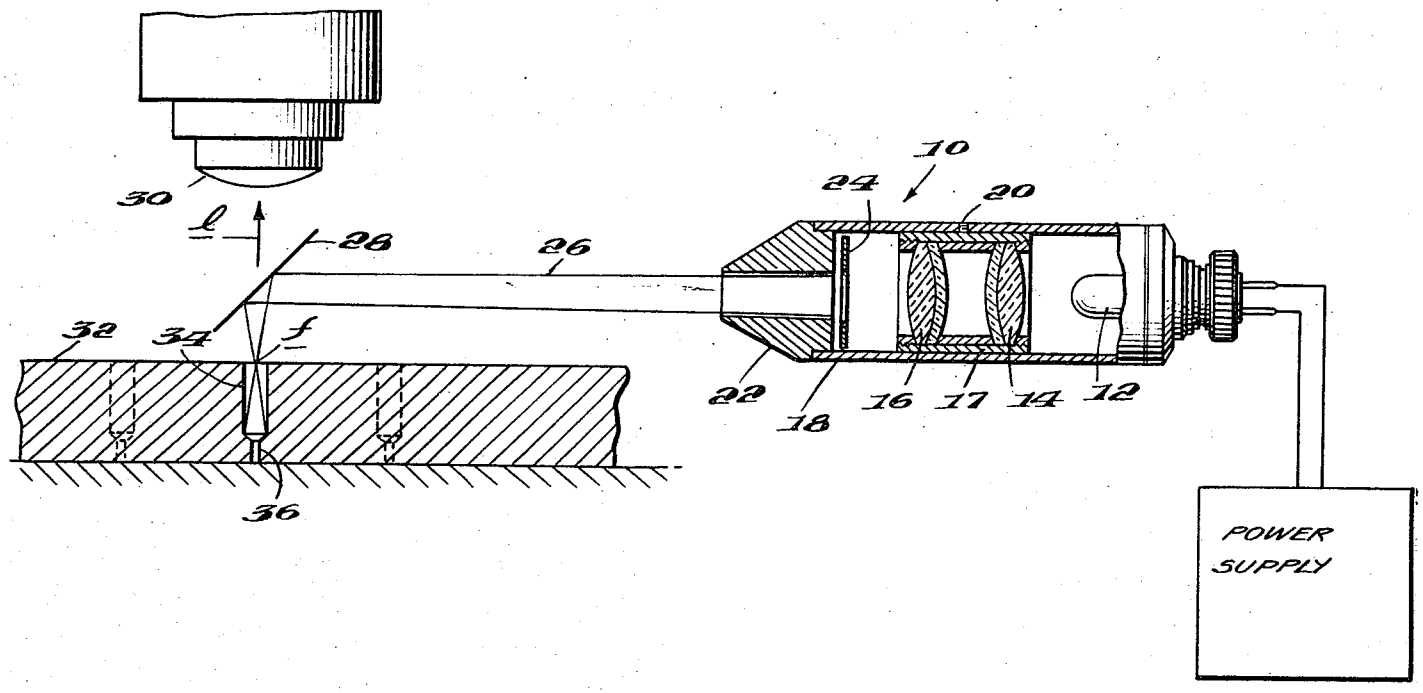

April 14, 1970 F. T. TARASCHI T873,008
METHOD OF INSPECTING THE INTERIOR OF SMALL HOLES
Original Filed May 5, 1967